(12) United States Patent
Ishii et al.

(10) Patent No.: US 12,204,785 B2
(45) Date of Patent: Jan. 21, 2025

(54) MEMCPY MICRO-OPERATION REDUCTION

(71) Applicant: Arm Limited, Cambridge (GB)

(72) Inventors: Yasuo Ishii, Austin, TX (US); Steven Daniel Maclean, Wake Forest, NC (US); Nicholas Andrew Plante, Austin, TX (US); Muhammad Umar Farooq, Austin, TX (US); Michael Brian Schinzler, Round Rock, TX (US); Nicholas Todd Humphries, Austin, TX (US); Glen Andrew Harris, Austin, TX (US)

(73) Assignee: Arm Limited, Cambridge (GB)

( * ) Notice: Subject to any disclaimer, the term of this patent is extended or adjusted under 35 U.S.C. 154(b) by 4 days.

(21) Appl. No.: 17/871,332

(22) Filed: Jul. 22, 2022

(65) Prior Publication Data

US 2024/0028241 A1    Jan. 25, 2024

(51) Int. Cl.
  *G06F 3/06* (2006.01)
(52) U.S. Cl.
  CPC ............ G06F 3/065 (2013.01); G06F 3/0604 (2013.01); G06F 3/0673 (2013.01)
(58) Field of Classification Search
  CPC ...... G06F 3/0604; G06F 3/065; G06F 3/0673; G06F 9/223; G06F 9/30; G06F 9/30003; G06F 9/30007; G06F 9/3004; G06F 9/30076; G06F 9/30079; G06F 9/30145; G06F 9/3016; G06F 9/30196; G06F 9/3818

USPC ....... 710/5, 74; 711/154, 161, 165; 712/208, 712/209–217

See application file for complete search history.

(56) References Cited

U.S. PATENT DOCUMENTS

| | | | |
|---|---|---|---|
| 2004/0088505 A1* | 5/2004 | Watanabe | G06F 11/2082 711/161 |
| 2006/0020754 A1* | 1/2006 | Suzuki | G06F 11/2058 711/114 |
| 2014/0032828 A1* | 1/2014 | Khailany | G06F 9/3004 711/E12.008 |
| 2016/0266803 A1* | 9/2016 | Funaoka | G06F 12/0891 |
| 2017/0285959 A1* | 10/2017 | Mishaeli | G06F 9/3861 |

* cited by examiner

*Primary Examiner* — Ilwoo Park
(74) *Attorney, Agent, or Firm* — NIXON & VANDERHYE P.C.

(57) ABSTRACT

There is provided a data processing apparatus in which decode circuitry receives a memory copy instruction containing an indication of a source area of memory, an indication of a destination area of memory, and an indication of a remaining copy length. In response to receiving the memory copy instruction, the decode circuitry generates at least one active memory copy operation or a null memory copy operation. The active memory copy operation causes one or more execution units to perform a memory copy from part of the source area of memory to part of the destination area of memory and the null memory copy operation leaves the destination area of memory unmodified.

12 Claims, 6 Drawing Sheets

CPYM Mop Sequence

+ Generate Predicate
  • No Alignment check
  • Determine Copy Size
  • Create Predicate for Load/Store
+ (Predicate) Load for Copying Data
+ (Predicate) Store for Copying Data
  • Repeat load/store pair N times (e.g., N=2)
+ Subtract X2 (size register) by copying size
+ If X2 is non-zero, branch to same PC
  • (repeating same instruction)

CPYM' Mop Sequence

+ ~~Generate Predicate~~
  • ~~No Alignment check~~
  • ~~Determine Copy Size~~
  • ~~Create Predicate for Load/Store~~
+ ~~(Predicate) Load for Copying Data~~
+ ~~(Predicate) Store for Copying Data~~
  • ~~Repeat load/store pair N times (e.g., N=2)~~
+ ~~Subtract X2 (size register) by copying size~~
+ If X2 is non-zero, branch to same PC
  • (repeating same instruction)

CPYM Mop Sequence

+ Generate Predicate
  - No Alignment check
  - Determine Copy Size
  - Create Predicate for Load/Store
+ (Predicate) Load for Copying Data
+ (Predicate) Store for Copying Data
  - Repeat load/store pair N times (e.g., N=2)
+ Subtract X2 (size register) by copying size
+ If X2 is non-zero, branch to same PC
  - (repeating same instruction)

| Instruction | PT | LAST_NT |
|---|---|---|
| CPYP(NT) | 0 | ? |
| CPYM(T) | 1 | 1 |
| CPYM(T) | 1 | 0 |
| CPYM(T) | 1 | 0 |
| CPYM(T) | 1 | 0 |
| CPYM(NT) | 0 | 0 |
| CPYE(NT) | 0 | 1 |

MEMCPY MICRO-OPERATION REDUCTION

TECHNICAL FIELD

The present disclosure relates to data processing and particularly to the generation of micro-operations.

DESCRIPTION

It is desirable to reduce or prevent the generation of micro-operations that do not achieve anything, so as to reduce resource wastage.

SUMMARY

Viewed from a first example configuration, there is provided a data processing apparatus comprising: decode circuitry configured to receive a memory copy instruction comprising an indication of a source area of memory, an indication of a destination area of memory, and an indication of a remaining copy length, wherein in response to receiving the memory copy instruction, the decode circuitry generates at least one active memory copy operation or a null memory copy operation; the active memory copy operation is configured to cause one or more execution units to perform a memory copy from part of the source area of memory to part of the destination area of memory; and the null memory copy operation is configured to leave the destination area of memory unmodified.

Viewed from a second example configuration, there is provided a method of data processing comprising: receiving a memory copy instruction comprising an indication of a source area of memory, an indication of a destination area of memory, and an indication of a remaining copy length, wherein in response to receiving the memory copy instruction, generating at least one active memory copy operation or a null memory copy operation; the active memory copy operation causes one or more execution units to perform a memory copy from part of the source area of memory to part of the destination area of memory; and the null memory copy operation leaves the destination area of memory unmodified.

Viewed from a third example configuration, there is provided a method of data processing comprising: receiving a memory copy instruction comprising an indication of a source area of memory, an indication of a destination area of memory, and an indication of a remaining copy length, wherein in response to receiving the memory copy instruction, generating at least one active memory copy operation or a null memory copy operation; the active memory copy operation causes one or more execution units to perform a memory copy from part of the source area of memory to part of the destination area of memory; and the null memory copy operation leaves the destination area of memory unmodified.

BRIEF DESCRIPTION OF THE DRAWINGS

The present invention will be described further, by way of example only, with reference to embodiments thereof as illustrated in the accompanying drawings, in which:

FIG. 6 shows an example sequence for dynamically determining when a given iteration of the main memory copy instruction is a first iteration.

DESCRIPTION OF EXAMPLE EMBODIMENTS

Figure 1:
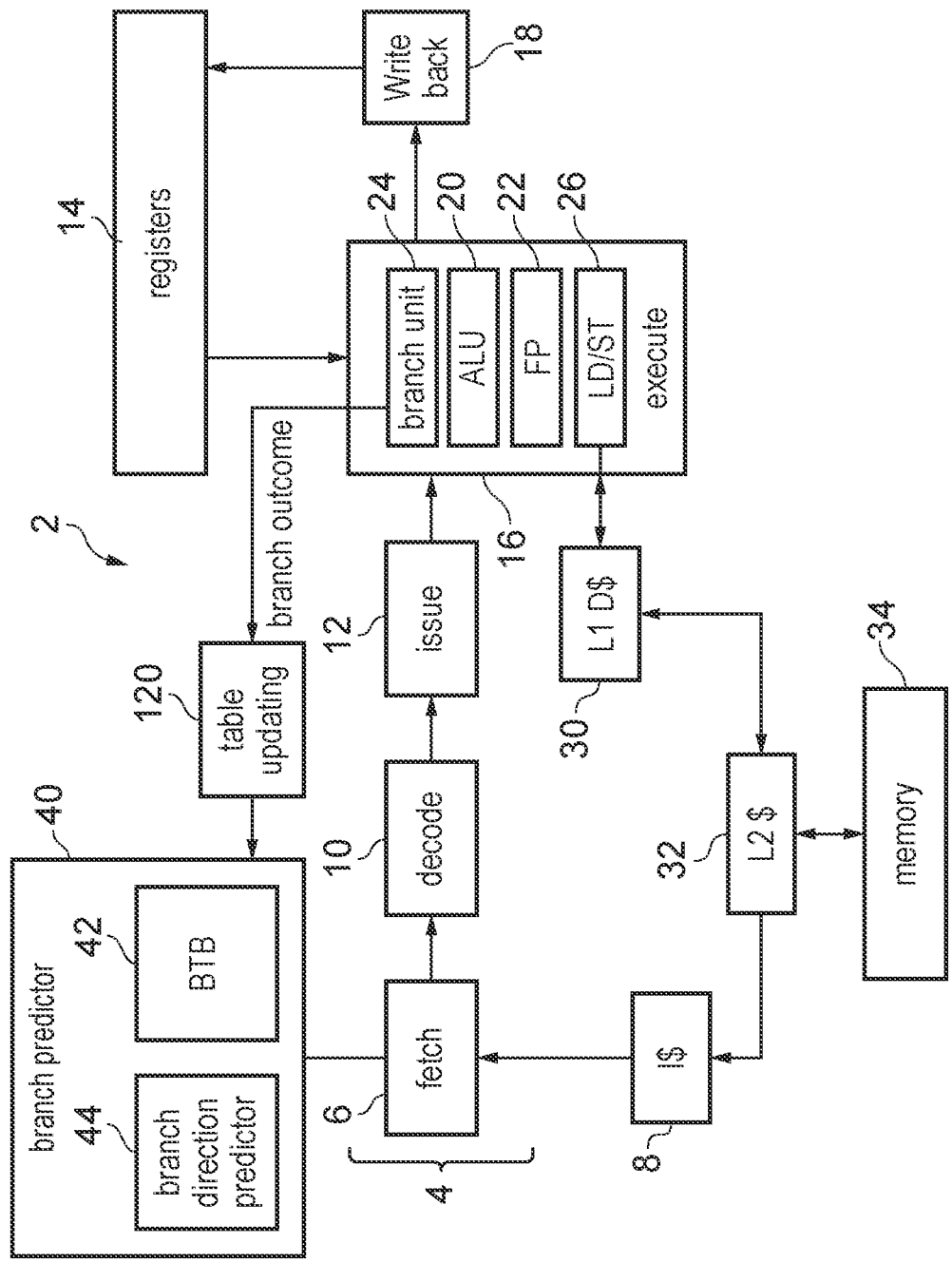
FIG. 1 schematically illustrates an apparatus.

Before discussing the embodiments with reference to the accompanying figures, the following description of embodiments is provided.

In some examples, there is provided a data processing apparatus comprising: decode circuitry configured to receive a memory copy instruction comprising an indication of a source area of memory, an indication of a destination area of memory, and an indication of a remaining copy length, wherein in response to receiving the memory copy instruction, the decode circuitry generates at least one active memory copy operation or a null memory copy operation; the active memory copy operation is configured to cause one or more execution units to perform a memory copy from part of the source area of memory to part of the destination area of memory; and the null memory copy operation is configured to leave the destination area of memory unmodified.

Memcpy is an instruction that copies one section of memory to another section of memory. This can be achieved via at least two instructions. A first instruction achieves alignment of memory. Memory can be thought of as a number of bytes. However, groups of bytes can be collected in order to form larger structures such as words, or cache lines. Alignment ensures that the boundaries of one of these larger structures are respected—e.g. to ensure that copying does not begin at a byte that is half way through a word. Alignment might also simply be performed in order to meet a requirement of the CPU or architecture. The alignment can be achieved by copying bytes individually until at least one of the source and destination reaches a boundary of the structure to be aligned (e.g. if 4-byte alignment is desired, then byte copying might be performed until the source reaches an address that is a multiple of four). The second instruction performs bulk copying without any reference to alignments. However, in a particularly short Memcpy, it is possible that the act of achieving alignment will mean that there are no further bytes to be copied. In this situation, the second instruction is meaningless, but will still incur some overhead when being processed. This may not be known at compile time, since the amount of data to be copied might not be known at compilation. The inventors of the present technique have realised that by using the decode stage, it is possible to decode a Memcpy instruction to either an operation that performs copying, or a null operation that has very little overhead. Consequently, by dynamically decoding the Memcpy instruction in this way, it is possible to inhibit the generation of operations that use processing resources. Note that the decoding process need not be performed in a single stage. In some examples, a single memory copy instruction is firstly converted into an active memory copy instruction (which subsequently decodes into the active memory copy operation) and a null memory copy instruction (which subsequently decodes into the null memory copy operation).

In some examples, the active memory copy operation is further configured to reduce the remaining copy length to produce an updated remaining copy length and to cause inhibition of incrementation of a program counter when the updated remaining copy length is greater than 0. The remaining copy length can be a value stored in a register, for instance. The active memory copy operation can reduce this stored value each time a chunk of memory is copied. That is, each invocation of the active memory copy operation can copy a further chunk (e.g. 64 bytes) of memory. The active memory copy operation can therefore be self-repeating in that it copies a chunk each time it is invoked, and does not allow the program counter to advance (thereby repeating itself) if there is any further memory to be copied.

In some examples, the inhibition of the program counter incrementation is achieved by performing a branch operation to a current value of the program counter. The branch operation therefore overrides the usual tendency of the program counter to increment each time an instruction is executed. Where the branch is not followed, the program counter will naturally increase to allow the next instruction to be executed.

In some examples, if the remaining copy length is expected to be greater than 0, then the decode circuitry is configured to generate the active memory copy operation, otherwise the decode circuitry is configured to generate the null memory copy operation. The null memory copy operation is therefore produced when there is no further copying to be performed (e.g. where the copying was performed by a previous instruction, as determined at runtime). Note that this cannot be easily checked by merely reading the remaining copy length, since doing so might take one or more processor cycles to read and compare the value and therefore beyond the capability of the decode circuitry, which must operate more quickly. If there is still copying to be done, then the active memory copy operation is generated, which performs copying as described previously.

In some examples, the decode circuitry is configured to generate the active memory copy operation based on whether the memory copy instruction is at a first iteration. This therefore causes a first iteration of the memory copy instruction to behave differently from other iterations of the memory copy instruction. Since it is a first iteration of the memory copy instruction that can unnecessarily generate micro-operations (e.g. where there are no bytes to be copied for instance), it is possible to treat this iteration differently and thereby potentially avoid the generation of the unnecessary micro-operations (e.g. by determining whether there is further copying to be performed).

In some examples, the decode circuitry is configured to generate the active memory copy operation based on a prediction of whether the memory copy instruction will alter program flow. This has the effect that, where the memory copy operation is repeated (via a branch), iterations of the memory copy operation other than (potentially) the first will not cause the null memory copy operation to be generated.

In some examples, the data processing apparatus comprises: branch prediction circuitry configured to generate the prediction. A branch predictor is used to perform predictions about branches in an instruction (or block of instructions). Such predictions might include whether a branch is present, the direction the branch will go (taken or not taken), and/or the address to which a branch may occur. The branch predictor circuitry is therefore usable to predict whether a particular instruction will cause the program flow to be altered (e.g. for each memory copy operation that is generated for the memory copy instruction). There are a number of different techniques for performing branch prediction (e.g. perceptron, TAGE), and the present technique is not limited to any particular one of these.

In some examples, the decode circuitry is configured to generate the active memory copy operation if the prediction is that the memory copy instruction will alter program flow, otherwise the decode circuitry is configured to generate the null memory copy operation. If the memory copy instruction will alter the program flow, then this means that a branch will occur, which in turn means that the memory copy operation will executed and not completed copying. As a consequence of this, an active memory copy operation should be generated (to perform the copying) rather than the null memory copy operation (which does not perform copying).

In some examples, one of the source area of memory and the destination area of memory is aligned according to an architectural requirement of the data processing apparatus or a requirement of the memory copy instruction. As previously explained, alignment refers to the idea that particular data structures in memory should begin at specific points in the memory structure rather than arbitrarily. For instance, words might begin at memory addresses that are exactly divisible by four (particularly if, for instance, they are four bytes long). In these examples, it is assumed that at least one of the source and the destination is already aligned as required by the memory copy instruction itself and the architecture. For instance, if the memory copy instruction is a word memory copy instruction, then the source might be expected to be aligned to word boundaries. Similarly, if the memory copy instruction is a float copy instruction then the source might be expected to be aligned to float boundaries. The architecture itself might enforce particular requirements too. For instance, the architecture might demand that memory copy operations are aligned to words, in which case, it will be assumed that at least one of the source/destination is word aligned.

In some examples, the active memory operation is configured to copy a predetermined amount of the source area of memory to the destination area of memory; and the predetermined amount is less than or equal to remaining copy length. In these examples, therefore, the active memory operation can either copy all of the remaining bytes that are remaining to be copied, or it can copy some of those bytes (leaving the remaining bytes to be handled by a further memory copy operation of some kind).

In some examples, the null memory copy operation is configured to cause the one or more execution units to act in a same way as for a NOP operation if there are no further bytes to be copied. A NOP operation is typically used to indicate that no action should be taken and no operation should be performed.

In some examples, the null memory copy operation is configured to cause inhibition of incrementation of a program counter when the updated remaining copy length is greater than zero. If there are bytes to be copied then the null memory copy operation can be used to prevent the program counter from incrementing (or reduce the program counter value in anticipation of it being incremented) such that it remains the same. This in turn causes the same instruction to be reiterated (repeated). However, where the generation of the null memory copy operation is dependent on the iteration of the memory copy instruction being zero, an active memory copy operation will be generated in place of a null memory copy operation—thereby causing data to actively be copied from the source to the destination.

In some examples, the decode circuitry is configured to generate only either the at least one active memory copy operation or the null memory copy operation in response to the memory copy instruction. Thus, a single memory copy instruction generates (at runtime, when decoding) the active memory operation or the null memory copy operation, but not both.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate operations (decoded instructions) comprising a number of micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

As shown in FIG. 1, the apparatus 2 includes a branch predictor 40 for predicting outcomes of branch instructions. The branch predictor is looked up based on addresses of instructions provided by the fetch stage 6 and provides a prediction on whether those instructions are predicted to include branch instructions, and for any predicted branch instructions, a prediction of their branch properties such as a branch type, branch target address and branch direction (predicted branch outcome, indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios.

As shown in FIG. 1, the apparatus 2 may have table updating circuitry 120 which receives signals from the branch unit 24 indicating the actual branch outcome of instructions, such as indications of whether a taken branch was detected in a given block of instructions, and if so the detected branch type, target address or other properties. If a branch was detected to be not taken then this is also provided to the table updating circuitry 120. The table updating circuitry 120 then updates state within the BTB 42, the branch direction predictor 44 and other branch prediction structures to take account of the actual results seen for an executed block of instructions, so that it is more likely that on encountering the same block of instructions again then a correct prediction can be made.

A memory copy instruction is an instruction that is used to copy data from one portion of a memory to another portion of a memory. One way to implement memory copy is with three different varieties of instruction—a preamble instruction, a main instruction, and an epilogue instruction. The prologue instruction is used to align the copying process with a data structure boundary. That is, a number of bytes of memory may be copied from the source to the destination until one of the source or destination reaches a given boundary (e.g. a word boundary). The main instruction may assume that the alignment performed with the prologue instruction has been performed and may be used to copy a certain number of bytes from the source to the destination. The epilogue instruction can be implemented in at least two different ways. In the first way, the main instruction is designed to finish the copy with a certain number of bytes left uncopied. The epilogue instruction can then finish the copy. Alternatively, the main instruction can complete the copy. In this case, the epilogue instruction can check that the copy has been completed (i.e. that there are no further bytes left to copied) and raises an exception if there are leftover bytes. Since the number of times that the main memory copy instruction is to be executed might not be known ahead of time, one possibility is to cause the main memory copy instruction to repeat itself until the number of remaining bytes receives a lower limit (e.g. 0 or the number of bytes achieved within a single iteration of the main memory copy instruction).

In practice, the micro-operations that correspond to the main memory copy instruction may achieve a number of things. For instance, they may move the pointers that point to the source and to the destination, actually copy bytes from the source to the destination, update the number of bytes to be copied, assess the number of bytes still to be copied, and finally cause a repeat of the instruction if appropriate.

A limitation of this approach arises when a small memory copy is to be performed, particularly where the act of copying bytes to achieve alignment via the preamble instruction results in the copying being completed. In this situation, the main memory copy instruction may still execute and may still result in the updating of pointers, the updating of the number of bytes to be copied, the assessment of the number of bytes to be copied, and so on. Even though the result of this might be to perform nothing, a number of processor cycles might be expended in such 'doing nothing'. By reducing the number of cycles expended in such situations, the efficiency of the processor can be improved.

For example, consider a situation in which a Memcpy is to be performed from a source to a destination. In a first example, the copy is of eight bytes. In the first example, this results in a preamble memory copy instruction (corresponding to 10 micro-operations) in which eight bytes are copied to try and achieve alignment (in this example, this might not be enough to achieve alignment). A main memory copy (10 micro-operation) instruction is then executed in which no bytes are copied (because the copying has completed) and an epilogue instruction is then executed, comprising one micro-operation (a NOP). Thus, a total of 21 micro-operations are executed. But 10 of these are performed needlessly. In another example in which 200 bytes are copied, the Memcpy performs a 10 micro-operation preamble memory copy operation in which 10 bytes are copied to achieve alignment. Three of main memory copy (10 micro-operation) instructions are then performed, each of which copies 64 bytes. Finally, a one micro-operation epilogue memory copy instruction is performed for a total of 41 micro-operations in which none of the micro-operations are unnecessary.

The inventors of the present technique have therefore proposed a process that makes it possible, in the case of small memory copies, to improve execution efficiency.

CPYP [x0]!, [x1]!, x2!

This instruction copies up to, for instance, 64 bytes from the source x1 to the destination x0. Having copied these bytes, the source will be 32 byte aligned such that the source address is a multiple of 32. Meanwhile, the remaining bytes counter x2 is decremented by the number of bytes that were copied.

CPYM [x0]!, [x1]!, x2!

This instruction copies up to, for instance, 64 bytes from the source x1 to the destination x0. Then, if the remaining copy size (x2) is greater than 0, a branch occurs to the same program counter value in order to iterate the instruction. In practice, this instruction can be decoded into two different types of main memory copy operation—(1) an active memory copy operation (CPYM) whose micro-operations performs the copying followed by a test to determine if the instruction should be repeated; and (2) a null memory copy operation (CPYM') whose micro-operation(s) merely tests whether the instruction should be repeated based on the value of x2.

CPYE [x0]!, [x1]!, x2!

Is an optional instruction to copy leftover data from CPYM. In one implementation, CPYM always completes the copy and in such a case, CPYE checks the remaining size and raise an exception if there is leftover data. For either case, CPYE acts as a NOP (no operation) if CPYM finished copying the data.

Figure 2:
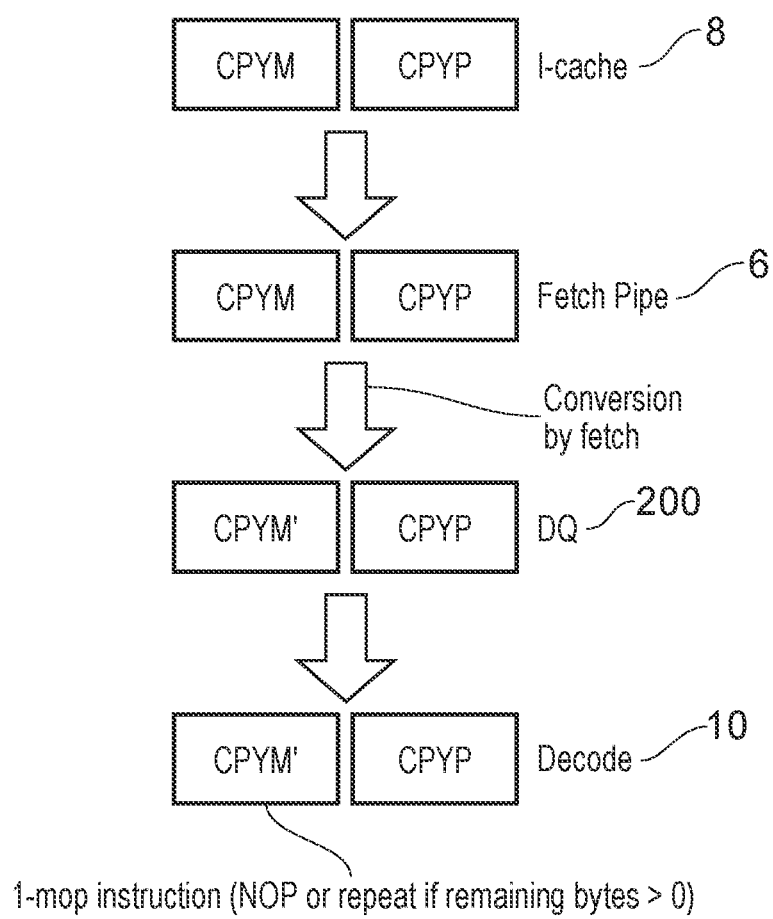
FIG. 2 illustrates the use of a preamble copy instruction and a main copy instruction where the main copy instruction leads to the generation of a null memory copy operation comprising one micro operation.

The first two of these instructions are illustrated in FIG. 2. Here, the instruction cache 8 shows a preamble copy instruction (CPYP) followed by a main copy instruction (CPYM). These instructions are received into a fetch pipe or fetch stage 6. Here, the fetch stage 6 converts the main copy instruction CPYM into either an active memory copy instruction CPYM or a null memory copy instruction CPYM' depending on whether the copying will have already been completed by the preamble copy instruction CPYP. In this example, the copying will already have been completed by the preamble copy instruction and so a null memory copy instruction CPYM' is inserted into a decode queue 200. The instructions are then decoded by the decode stage 10. The result is a preamble copy operation CPYP comprising one or more micro-operations that performs all of the copying to be done. A null memory copy operation CPYM' follows, which in this example translates to a single micro-operation.

In executing the null memory copy operation, no copying of bytes between the source and the destination occurs. Instead, only the question of whether to branch or not is considered. That is, if there are still bytes to be copied then the operation causes a branch to the same instruction. Phrased differently, if the null memory copy operation occurs then the main copy instruction is performed again.

Note that in this example, the main memory copy instruction is replaced in the decode queue with either an active memory copy instruction or a null memory copy instruction, which in turn are decoded into an active memory copy operation or a null memory copy operation respectively, which in turn can be converted into a number of micro-operations. However, the process of replacing and then decoding (and converting) could be split differently. For instance, these might be performed as a single stage in which the active memory copy micro-operations or null memory copy micro-operation are generated directly from the main memory copy instruction.

Figure 3:
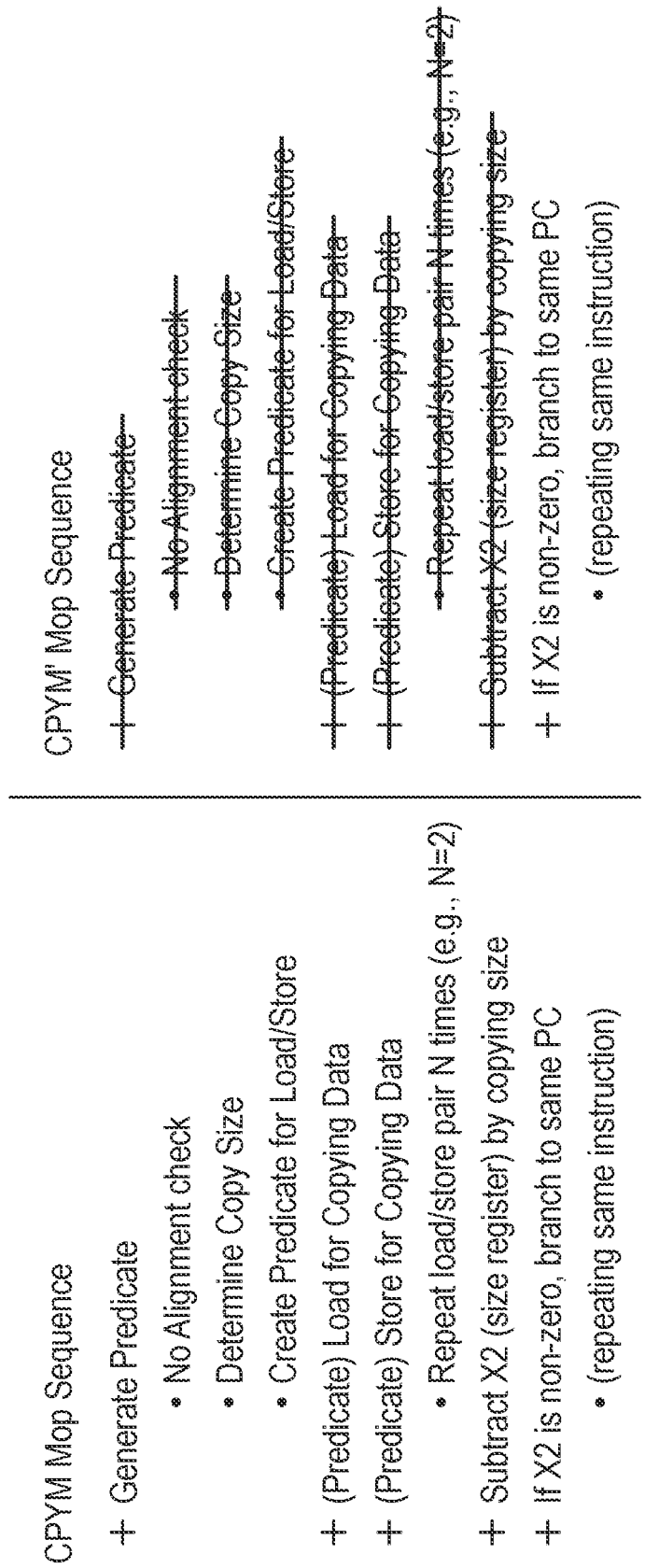
FIG. 3 illustrates the micro-operations performed by the active memory copy operation and the null memory copy operation.

FIG. 3 illustrates the micro-operations performed by the active memory copy operation (CPYM) and the null memory copy operation (CPYM') respectively, each of which can derive from the main memory copy instruction.

The micro-operations performed by the active memory copy operation (CPYM) are as follows:
Generate predicate
    No alignment check (it is assumed that alignment is already achieved)
    Determine copy size
    Create predicate for load/store, which controls which bits of a block of bits are copied
Load N bytes of data to be copied to a register and store the N bytes of data to be copied from the register, according to a predicate which indicates the N bytes
Subtract the size register (x2) by the amount of copied data
If x2 is non zero, branch to same PC (repeating same instruction)

The micro-operation(s) performed by the null memory copy operation (CPYM') perform the following micro-operations:
If x2 is non zero, branch to same PC (repeating same instruction)

Figure 4:
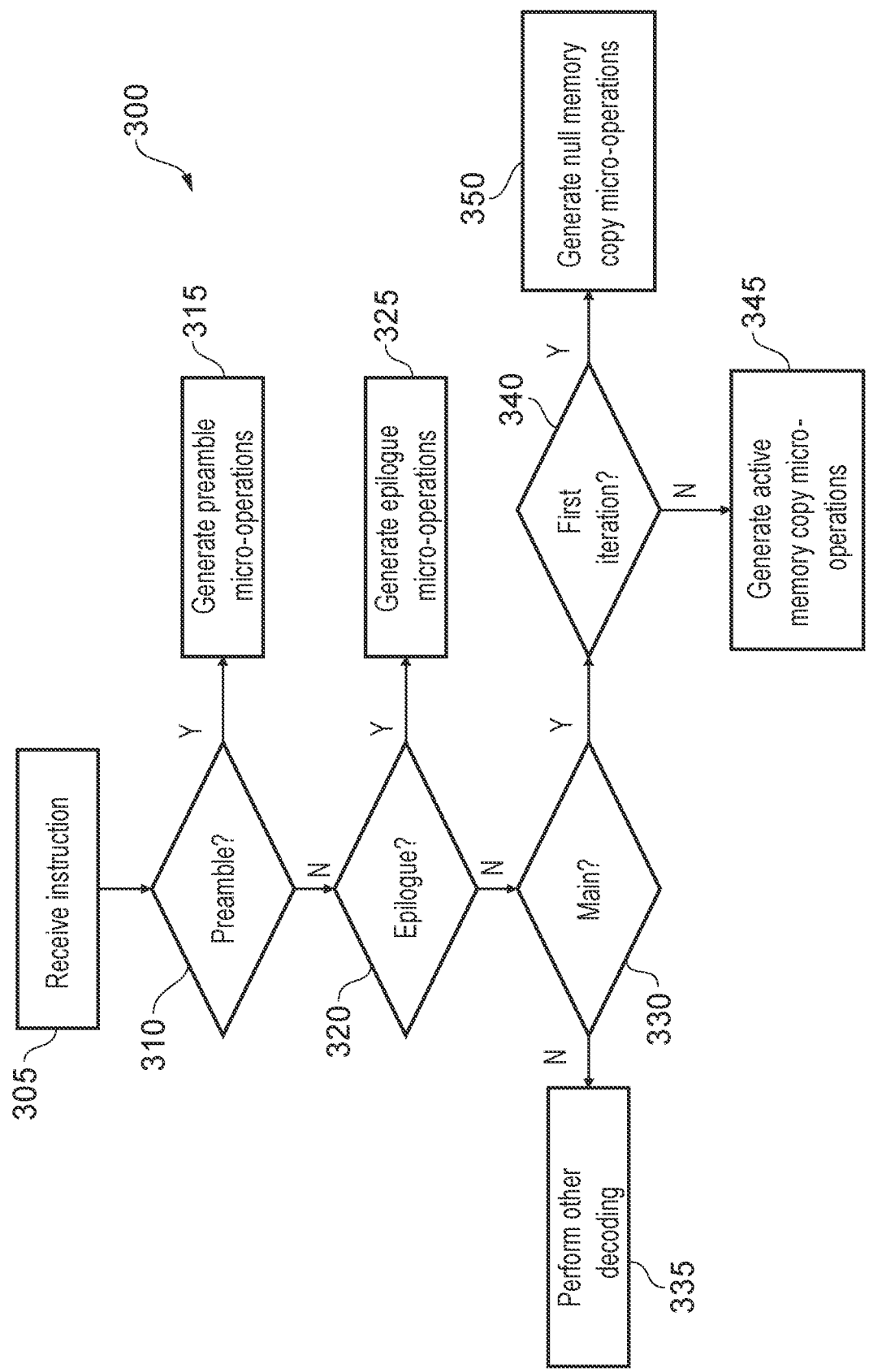
FIG. 4 contains a flowchart that shows an example of how the decoding process is performed.

FIG. 4 contains a flowchart 300 that shows an example of how the decoding process is performed. At a step 305, an instruction is received. At a step 310, it is determined whether or not the instruction is a preamble memory copy instruction. If so, then at step 315, micro-operations corresponding to the preamble memory copy instruction are generated (possibly via an intermediate preamble memory copy operation). Otherwise, at a step 320, it is determined whether the instruction received at step 305 is an epilogue instruction. If so, then at step 325, micro-operations corresponding to the epilogue memory copy instruction are generated (possibly via an intermediate epilogue memory copy operation). Otherwise, at step 330, it is determined whether the instruction is a main memory copy instruction. If not, then other decoding corresponding to the instruction that has been received is performed at step 335. Otherwise, at step 340, it is determined whether this is a first iteration of the main memory copy instruction (recall that the instruction may repeat itself). If so, then at step 350, micro-operations corresponding to a null memory copy instruction are generated (again possibly via an intermediate null memory copy operation). Otherwise, at step 345, micro-operations corresponding to an active memory copy instruction are generated (again possibly via an intermediate active memory copy operation).

Consequently, the null memory copy operation is only performed on the first iteration of the instruction. This merely checks whether there are still bytes to be copied and repeats the instruction if so. Since a further iteration of the instruction would not be a first iteration of the instruction, the active memory copy operation will be performed on a second time around.

Using this technique, consider the example that was described above of a Memcpy instruction that copies either eight or 200 bytes. In the eight-byte case, there is still a preamble memory copy instruction that requires 10 micro-operations and copies eight bytes. Then, however, there is a main memory copy instruction. In a first iteration of the main memory copy instruction, a null memory copy instruction is executed. This is a single micro-operation instruction that copies zero bytes. Here, it is determined if there are more bytes to be copied. In this case, there is not (all bytes have been copied by the preamble instruction), so the next instruction to be executed is simply the epilogue memory copy instruction, which is a single micro-operation. This is therefore a total of 12 micro-operations. In the case of the 200 bytes case, a 10 micro-operation preamble instruction is again executed, which copies 10 bytes. This is then followed by the main memory copy instruction. In a first iteration, a null memory copy instruction is executed. This is a single micro-operation instruction that copies zero bytes. Here, it is determined if there are more bytes to be copied. In this case, there is. Therefore, the instruction repeats itself. This time, it is not the first iteration of the null memory copy instruction. Consequently, it is replaced by a 10 micro-operation active memory copy instruction, which actively copies bytes from the source to the destination. This is repeated three times before the number of bytes to be copied runs out. Finally, an epilogue memory copy instruction is executed, which results in a single micro-operation being performed. This results in a total of 42 micro-operations being performed.

As compared to a version of the present technique where the null memory copy operation is not used, the number of micro-operations for the eight byte copying case decreases from 21 micro-operations to 12 micro-operations. In the 200 byte copying case, the number of micro operations increases from 41 micro-operations to 42 micro-operations.

Thus, although a very small number of micro-operations are added to the large copying case, many micro-operations are saved in the small copying case. Furthermore, as a percentage of the micro-operations performed, the saving for the small copy is much greater than the saving for the large copy. The inventors of the present technique have also discovered that the number of small copies can outnumber the number of large copies in a number of applications.

Figure 5:
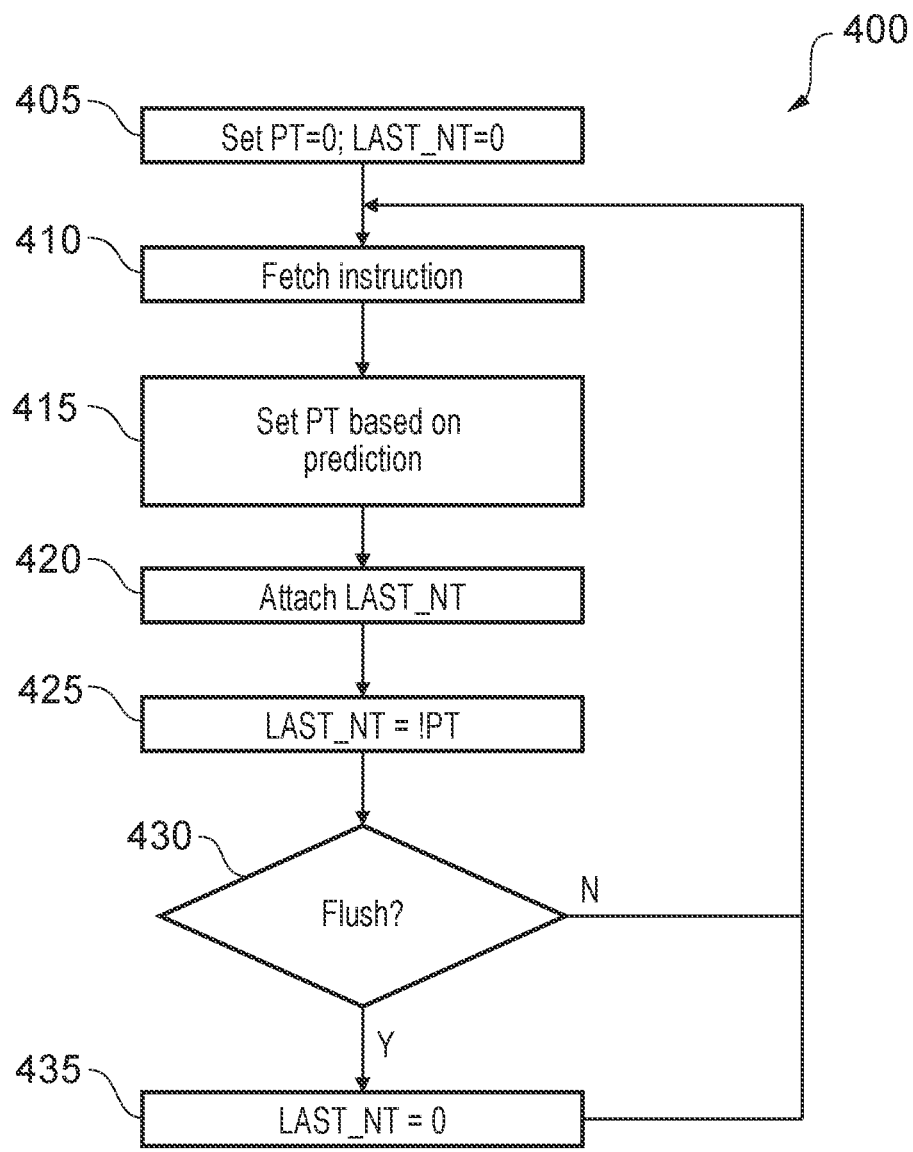
FIG. 5 shows a flowchart that illustrates a method of dynamically determining when a given iteration of the main memory copy instruction is a first iteration.

FIG. 5 shows a flowchart 400 that illustrates a method of dynamically determining when a given iteration of the main memory copy instruction is a first iteration. It will be appreciated that, from the program code itself, it may not normally be possible for the hardware to easily determine the iteration number of a given instruction. However, this information can be estimated by using branch prediction information as will be shown.

At a step 405, the predicted taken flag (PT) and the last not taken flag (LAST_NT) are both set to 0. Then, at step 410, a next instruction is fetched. At step 415, the PT flag is set (or cleared) based on whether it is predicted that the current instruction will alter the program flow or not (e.g. whether there will be a branch or not from the instruction). The value of LAST_NT is then attached to the fetched instruction at step 420 and is updated to correspond with the inverse of the PT flag at step 425. At step 430, it is determined whether a pipeline flush has occurred. If so, then LAST_NT is cleared. In either case, the process returns to step 410 where the next instruction is fetched.

The flag LAST_NT therefore indicates whether or not the previous instruction was predicted not taken. If the previous instruction was predicted not taken and if the current instruction is a main memory copy instruction (CPYM) then it can be assumed that this is the first iteration of the main memory copy instruction, and therefore this can be used to generate a null memory copy operation (CPYM'). Otherwise, an active memory copy operation (CPYM) can be generated.

FIG. 6 shows an example sequence. The process begins with a preamble memory copy instruction (CPYP). This instruction never branches and so it is predicted not taken (PT=0). The value of LAST_NT is not known in this example (in practice, it does not matter because the instruction is not a main memory copy instruction). However, it is now updated to the inverse of PT and is therefore set to 1. The next instruction is a CPYM instruction and is the first iteration of that instruction. It is predicted taken, meaning that previous executions of the instruction have predicted that there will be data to be copied. This has no immediate effect. However, the current value of LAST_NT (1) is attached before being updated to the inverse of PT. It therefore becomes 0. Since this is a main memory copy instruction and since LAST_NT is set (i.e. 1), it causes a null memory copy operation (CPYM') to be generated.

For the next three iterations, the instruction is predicted taken (PT=1) and LAST_NT remains as 0. Consequently, the active memory copy operation is generated.

In a fourth iteration, the instruction is predicted not taken (PT=0), meaning that it has previously been predicted that there is no further data to be copied and so the branch to repeat the instruction has not been taken. LAST_NT remains as the pevious value of PT and is therefore equal to 1. Since LAST_NT is 0, a main memory copy instruction is generated, which copies the last remaining bytes and does not repeat the instruction.

Finally, a CPYE instruction is executed, which checks that there are no remaining bytes to be copied. Note that no memory copy operation is generated (despite LAST_NT=1) because this is not a main memory copy instruction.

Consequently, the null memory copy operation is generated to coincide with a first iteration of the main memory copy instruction.

The above figures demonstrate how it is possible to reduce the number of micro-operations generated for a small memory copy. This can be achieved dynamically (i.e. at runtime) and therefore does not require knowledge of the underlying program code. The above examples assumes that alignment is achieved via a preamble memory copy instruction and that the copying is achieved via repeated invocation of a main memory copy instruction. However, as an alternative to this, it is possible to finish the CPYM instruction without finishing the entire data copy (e.g. to exit if the remaining copy size is less than 32 bytes). In such implementations, the CPYE instruction can generate both an active copy operation and the null copy operation. If the remaining copy size cannot be finished within a single iteration, then iteration of the CPYE instruction could also be performed (as occurs for the CPYM instruction).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
   decode circuitry configured to receive a memory copy instruction comprising an indication of a source area of memory, an indication of a destination area of memory, and an indication of a remaining copy length, wherein
   in response to receiving the memory copy instruction, the decode circuitry generates at least one active memory copy operation or a null memory copy operation;
   the active memory copy operation is configured to cause one or more execution units to perform a memory copy from part of the source area of memory to part of the destination area of memory; and
   the null memory copy operation is configured to leave the destination area of memory unmodified.

2. The data processing apparatus according to clause 1, wherein
   the active memory copy operation is further configured to reduce the remaining copy length to produce an updated remaining copy length and to cause inhibition of incrementation of a program counter when the updated remaining copy length is greater than 0.

3. The data processing apparatus according to clause 2, wherein
   the inhibition of the program counter incrementation is achieved by performing a branch operation to a current value of the program counter.

4. The data processing apparatus according to any preceding clause, wherein
if the remaining copy length is expected to be greater than 0, then the decode circuitry is configured to generate the active memory copy operation, otherwise the decode circuitry is configured to generate the null memory copy operation.

5. The data processing apparatus according to any preceding clause, wherein
the decode circuitry is configured to generate the active memory copy operation based on whether the memory copy instruction is at a first iteration.

6. The data processing apparatus according to any preceding clause, wherein
the decode circuitry is configured to generate the active memory copy operation based on a prediction of whether the memory copy instruction will alter program flow.

7. The data processing apparatus according to clause 5, comprising:
branch prediction circuitry configured to generate the prediction.

8. The data processing apparatus according to any one of clauses 6-7, wherein
the decode circuitry is configured to generate the active memory copy operation if the prediction is that the memory copy instruction will alter program flow, otherwise the decode circuitry is configured to generate the null memory copy operation.

9. The data processing apparatus according to any preceding clause, wherein
one of the source area of memory and the destination area of memory is aligned according to an architectural requirement of the data processing apparatus or a requirement of the memory copy instruction.

10. The data processing apparatus according to any preceding clause, wherein
the active memory operation is configured to copy a predetermined amount of the source area of memory to the destination area of memory; and
the predetermined amount is less than or equal to remaining copy length.

11. The data processing apparatus according to any one of clauses 1-10, wherein
the null memory copy operation is configured to cause the one or more execution units to act in a same way as for a NOP operation if there are no further bytes to be copied.

12. The data processing apparatus according to any one of clauses 1-10, wherein
the null memory copy operation is configured to cause inhibition of incrementation of a program counter when the updated remaining copy length is greater than zero.

13. The data processing apparatus according to any preceding clause, wherein
the decode circuitry is configured to generate only either the at least one active memory copy operation or the null memory copy operation in response to the memory copy instruction.

14. A method of data processing comprising:
receiving a memory copy instruction comprising an indication of a source area of memory, an indication of a destination area of memory, and an indication of a remaining copy length, wherein
in response to receiving the memory copy instruction, generating at least one active memory copy operation or a null memory copy operation;
the active memory copy operation causes one or more execution units to perform a memory copy from part of the source area of memory to part of the destination area of memory; and
the null memory copy operation leaves the destination area of memory unmodified.

15. A non-transitory computer-readable medium to store computer-readable code for fabrication of a data processing apparatus comprising:
decode circuitry configured to receive a memory copy instruction comprising an indication of a source area of memory, an indication of a destination area of memory, and an indication of a remaining copy length, wherein
in response to receiving the memory copy instruction, the decode circuitry generates at least one active memory copy operation or a null memory copy operation;
the active memory copy operation is configured to cause one or more execution units to perform a memory copy from part of the source area of memory to part of the destination area of memory; and
the null memory copy operation is configured to leave the destination area of memory unmodified.

We claim:

1. A data processing apparatus comprising:
decode circuitry configured to receive a memory copy instruction comprising an indication of a source area of memory, an indication of a destination area of memory, and an indication of a remaining copy length, wherein
in response to receiving the memory copy instruction:
if a remaining copy length is expected to be greater than 0, then the decode circuitry is configured to generate an active memory copy operation, otherwise
the decode circuitry is configured to generate a null memory copy operation;
the active memory copy operation is configured to cause one or more execution units to perform a memory copy from part of the source area of memory to part of the destination area of memory; and
the null memory copy operation is configured to cause the one or more execution units to act in a same way as for a NOP operation if there are no further bytes to be copied such that the destination area of memory is left unmodified; and
the null memory copy operation is configured to cause inhibition of incrementation of a program counter when an updated remaining copy length is greater than zero.

2. The data processing apparatus according to claim 1, wherein
the active memory copy operation is further configured to reduce the remaining copy length to produce the updated remaining copy length and to cause inhibition of incrementation of a program counter when the updated remaining copy length is greater than 0.

3. The data processing apparatus according to claim 2, wherein
the inhibition of the program counter incrementation is achieved by performing a branch operation to a current value of the program counter.

4. The data processing apparatus according to claim 1, wherein
the decode circuitry is configured to generate the active memory copy operation based on whether the memory copy instruction is at a first iteration.

5. The data processing apparatus according to claim 4, comprising:
branch prediction circuitry configured to generate the prediction.

6. The data processing apparatus according to claim 1, wherein
the decode circuitry is configured to generate the active memory copy operation based on a prediction of whether the memory copy instruction will alter program flow.

7. The data processing apparatus according to claim 6, wherein
the decode circuitry is configured to generate the active memory copy operation if the prediction is that the memory copy instruction will alter program flow, otherwise the decode circuitry is configured to generate the null memory copy operation.

8. The data processing apparatus according to claim 1, wherein
one of the source area of memory and the destination area of memory is aligned according to an architectural requirement of the data processing apparatus or a requirement of the memory copy instruction.

9. The data processing apparatus according to claim 1, wherein
the active memory operation is configured to copy a predetermined amount of the source area of memory to the destination area of memory; and
the predetermined amount is less than or equal to remaining copy length.

10. The data processing apparatus according to claim 1, wherein
the decode circuitry is configured to generate only either the at least one active memory copy operation or the null memory copy operation in response to the memory copy instruction.

11. A method of data processing comprising:
receiving a memory copy instruction comprising an indication of a source area of memory, an indication of a destination area of memory, and an indication of a remaining copy length, wherein
in response to receiving the memory copy instruction:
in response to an expectation that a remaining copy length is to be greater than 0, the decode circuitry generates an active memory copy operation, otherwise
the decode circuitry generates a null memory copy operation;
the active memory copy operation causes one or more execution units to perform a memory copy from part of the source area of memory to part of the destination area of memory;
the null memory copy operation causes the one or more execution units to act in a same way as for a NOP operation in response to there being no further bytes to be copied such that the destination area of memory is left unmodified; and
the null memory copy operation causes inhibition of incrementation of a program counter when an updated remaining copy length is greater than zero.

12. A non-transitory computer-readable medium to store computer-readable code for fabrication of a data processing apparatus comprising:
decode circuitry configured to receive a memory copy instruction comprising an indication of a source area of memory, an indication of a destination area of memory, and an indication of a remaining copy length, wherein
in response to receiving the memory copy instruction:
if a remaining copy length is expected to be greater than 0, then the decode circuitry is configured to generate an active memory copy operation, otherwise
the decode circuitry is configured to generate a null memory copy operation;
the active memory copy operation is configured to cause one or more execution units to perform a memory copy from part of the source area of memory to part of the destination area of memory; and
the null memory copy operation is configured to cause the one or more execution units to act in a same way as for a NOP operation if there are no further bytes to be copied such that the destination area of memory is left unmodified; and
the null memory copy operation is configured to cause inhibition of incrementation of a program counter when an updated remaining copy length is greater than zero.

* * * * *